United States Patent
Cohen

(10) Patent No.: US 7,702,885 B2
(45) Date of Patent: Apr. 20, 2010

(54) FIRMWARE EXTENDABLE COMMANDS INCLUDING A TEST MODE COMMAND FOR A MICROCONTROLLER-BASED FLASH MEMORY CONTROLLER

(75) Inventor: Daniel Scott Cohen, Baltimore, MD (US)

(73) Assignee: Atmel Corporation, San Jose, CA (US)

( * ) Notice: Subject to any disclaimer, the term of this patent is extended or adjusted under 35 U.S.C. 154(b) by 28 days.

(21) Appl. No.: 11/366,919

(22) Filed: Mar. 2, 2006

(65) Prior Publication Data

US 2007/0226476 A1 Sep. 27, 2007

(51) Int. Cl.
*G06F 9/00* (2006.01)
(52) U.S. Cl. .................... 712/208; 712/227
(58) Field of Classification Search ............ 712/43, 712/208, 213, 225, 227, 229, 232; 711/100; 714/733, 734, 742
See application file for complete search history.

(56) References Cited

U.S. PATENT DOCUMENTS

| | | | |
|---|---|---|---|
| 5,353,420 A * | 10/1994 | Zaidi | 712/210 |
| 5,506,738 A | 4/1996 | Tamura et al. | 360/132 |
| 5,752,066 A | 5/1998 | Bealkowski et al. | |
| 5,793,774 A | 8/1998 | Usui et al. | 371/21.2 |
| 5,828,868 A * | 10/1998 | Sager et al. | 713/501 |
| 5,838,692 A * | 11/1998 | Tobin | 714/724 |
| 6,009,496 A | 12/1999 | Tsai | 711/103 |
| 6,154,788 A | 11/2000 | Robinson et al. | 710/8 |
| 6,308,255 B1 * | 10/2001 | Gorishek et al. | 712/209 |
| 6,584,540 B1 | 6/2003 | Shinmori | 711/103 |
| 6,654,848 B1 * | 11/2003 | Cleveland et al. | 711/103 |
| 6,754,765 B1 | 6/2004 | Chang et al. | 711/103 |
| 6,778,436 B2 | 8/2004 | Piau et al. | 365/185.03 |
| 2002/0141689 A1 | 10/2002 | Qian et al. | |
| 2002/0166044 A1 | 11/2002 | Muth | |
| 2003/0067814 A1 | 4/2003 | Piau et al. | 365/189.05 |
| 2003/0079077 A1 | 4/2003 | Piau et al. | 711/103 |
| 2003/0131185 A1 | 7/2003 | Dover | 711/103 |
| 2003/0149821 A1 | 8/2003 | Matsui et al. | |
| 2003/0163624 A1 | 8/2003 | Matsui et al. | |

(Continued)

FOREIGN PATENT DOCUMENTS

EP 1367496 A2 12/2003
EP 1408405 A1 4/2004

OTHER PUBLICATIONS

Tanenbaum, "Structured Computer Organization, 2nd Edition," 1984, pp. 10-12.*

(Continued)

*Primary Examiner*—David J Huisman
(74) *Attorney, Agent, or Firm*—Schwegman, Lundberg & Woessner, P.A.

(57) ABSTRACT

A system and method for expanding the command set of a memory controller is provided. In one implementation, the method includes decoding a first plurality of commands through a command decoding state machine, and in response to the command decoding state machine decoding an extended command, waking the microcontroller to process an additional command other than a command among the first plurality of commands. The extended command is a command that notifies the microcontroller of the additional command to be processed.

31 Claims, 3 Drawing Sheets

U.S. PATENT DOCUMENTS

| | | |
|---|---|---|
| 2004/0019736 A1 | 1/2004 | Kim et al. .................. 711/103 |
| 2004/0049627 A1 | 3/2004 | Piau et al. .................. 711/103 |
| 2005/0015541 A1 | 1/2005 | De Santis et al. |
| 2005/0210179 A1 | 9/2005 | Walmsley et al. |
| 2005/0258456 A1 | 11/2005 | Margolin |
| 2005/0289428 A1* | 12/2005 | Ong .......................... 714/742 |
| 2006/0161420 A1* | 7/2006 | Sugawara .................. 703/26 |

OTHER PUBLICATIONS

"European Application Serial No. 07752166.4 , Supplementary European Search Report mailed May 29, 2009", 5 pgs.

"In-Line Processing Commands for Storage Devices", *IBM Technical Disclosure Bulletin*, 33(9), (Feb. 1991), 365-373.

* cited by examiner

| | 1ST BUS CYCLE | | 2ND BUS CYCLE | | 3RD BUS CYCLE | | 4TH BUS CYCLE | |
|---|---|---|---|---|---|---|---|---|
| | ADDR <12:1> | IO | ADDR <12:1> | IO | ADDR <12:1> | IO | ADDR <12:1> | IO |
| REGISTERS ENTER AVR REGISTER READ MODE | 0x555 | AA | 0xAAA | 55 | 0x555 | ENTER REG READ CODE | | IO |
| EXIT AVR REGISTER READ MODE | 0x555 | AA | 0xAAA | 55 | 0x555 | EXIT CODE | | |
| | 0xXXX | F0 | | | | | | |
| WRITE AVR REGISTER | 0x555 | AA | 0xAAA | 55 | 0x555 | WRITE REG CODE | REG A | DIN |
| LOAD TRIM DEFAULTS | 0x555 | AA | 0xAAA | 55 | 0x01 | EXT CMD CODE | 0xXXX A<20> MUST BE 0 | 0xXX |
| REF C REFERENCE CELL PROGRAM | 0x555 | AA | 0xAAA | 55 | 0x02 | EXT CMD CODE | PLANE A | 0xXXX |
| REFERENCE CELL ERASE | 0x555 | AA | 0xAAA | 55 | 0x03 | EXT CMD CODE | REF A | 0xXXX |
| OTHERS EXTENDED COMMANDS | 0x555 | AA | 0xAAA | 55 | OPCODE | EXT CMD CODE | ADDR | DIN |

FIRMWARE EXTENDABLE COMMANDS INCLUDING A TEST MODE COMMAND FOR A MICROCONTROLLER-BASED FLASH MEMORY CONTROLLER

FIELD OF THE INVENTION

The present invention relates generally to digital controller systems, and more particularly to microcontroller based flash memory digital controller systems.

BACKGROUND OF THE INVENTION

Memory systems and memory devices (e.g., a digital flash memory device) typically include a digital controller for the storage and retrieval of digital information to and from a memory (e.g., a non-volatile flash memory). In a conventional memory device, such as a digital flash memory device, most of the command sequences (e.g., read, write, copy, erase, and so on) that are supported by the digital flash memory device are usually known at the time the digital flash memory device is specified and architected. Consequently, the command sequences are typically set (and fixed) in hardware (e.g., the command sequences are hardwired into a state machine or fixed in a read-only memory (ROM)) and, therefore, the command sequences generally cannot be modified after the digital flash memory device has been fabricated. Such hardwired state machines typically require recoding for any changes made to the pre-determined sequences, which is an expensive and time consuming process which requires that a new digital flash memory device be fabricated and tested.

Accordingly, what is needed is a system and method for extending the number of commands that are available to be executed (or processed) by a conventional memory device that includes a state machine, which extended commands (when processed) do not require that the state machine be recoded. The present invention addresses such a need.

SUMMARY OF THE INVENTION

In general, in one aspect, this specification describes a method of operation for a digital controller system including a command decoding state machine and a microcontroller. The method includes decoding a first plurality of commands through the command decoding state machine, and in response to the command decoding state machine decoding an extended command, waking the microcontroller to process an additional command other than a command among the first plurality of commands. The extended command is a command that notifies the microcontroller of the additional command to be processed.

Particular implementations can include one or more of the following features. Waking the microcontroller to process the additional command can include waking the microcontroller to decode an opcode associated with the extended command. The additional command and the extended command can be received from a user. The command decoding state machine can be operable to process commands independent of the microcontroller. The digital controller system can further include a memory that interfaces with the microcontroller. The command decoding state machine can be a user interface for receiving user commands and user data. The memory can comprise one of a flash memory, a dynamic RAM (DRAM), or a static RAM (SRAM). The method can further include waking the microcontroller to process a timed command in response to the command decoding state machine decoding the timed command. The timed command can be a command that requires more than one clock cycle to be fully processed. The method can further include receiving an indication that the digital controller system is operating in a test mode, and using the extended command to notify the microcontroller of a test mode command to be processed during the test mode.

In general, in another aspect, this specification describes a digital controller system. The digital controller system includes a command decoding state machine operable to decode a first plurality of commands, and a microcontroller. In response to the command decoding state machine decoding an extended command, the command decoding state machine is operable to wake the microcontroller to process an additional command other than a command among the first plurality of commands. The extended command is a command that notifies the microcontroller of the additional command to be processed.

Particular implementations can include one or more of the following features. The digital controller system can further include a register operable to store an opcode associated with the extended command prior to the additional command being processed by the microcontroller. The digital controller system can further include a test mode signal to indicate whether the digital controller system is operating in a test mode. The additional command can comprise an opcode. The digital controller system can further include a register operable to store the opcode prior to the opcode being processed by the microcontroller. The opcode and the extended command can be received by the digital controller system from a user.

In general, in another aspect, this specification describes a command decoder including a command decoding state machine operable to decode a first plurality of commands including an extended command, and a register accessible by a microcontroller for storing an opcode associated with the extended command. The command decoder is operable to wake the microcontroller when the command decoding state machine decodes the extended command. The extended command is a command that notifies the microcontroller of the opcode to be processed.

Particular implementations can include one or more of the following features. The first plurality of commands and the extended command can be hardwired into the command decoding state machine at a time of fabrication of the command decoder. The command decoder can further include synchronization logic operable to synchronize a command received by the command decoder from a first clock domain to a second clock domain that is different from the first clock domain.

Implementations can provide one or more of the following advantages. A hybrid approach of using a state machine as a user interface and a microcontroller (or a co-processor, microprocessor, or another state machine) as the programming and erase interface to a memory core provides a compromise between program flexibility, speed, and power. The state machine-based command decoder provides a means for detecting and managing user commands, managing information related to commands (such as address, data, opcodes, and flags). controlling the system clock, and waking the microcontroller when a complex command (e.g. a timed command) is required to be processed. A digital controller system is described that makes use of software extendable commands. In one implementation, an extended command comprises a single, specific command sequence. The single command can be interpreted along with an (e.g., 8-bit) opcode that the command decoder stores in a separate opcode register. By implementing an 8-bit opcode register, and a testmode signal, up to 256 additional user commands and 256 additional testmode commands can be supported. Test modes and debug features making use of the microcontroller through firmware are easily implemented using a combination of the extended command and a testmode pin (FIG. 1, 116) associated with the digital controller system. The testmode pin is used to prevent a user from accidentally entering a testmode command since the testpin (in one implementation) is not bonded out in the final packaged parts sent to customers. The test modes and debug features permit a digital controller to be tested (e.g., during manufacturing) without requiring use of a separate test controller.

BRIEF DESCRIPTION OF THE DRAWINGS

FIG. 4 illustrates a table including test mode commands and extended commands that can be executed by the digital controller system of FIG. 1 according to one implementation of the invention.

Like reference symbols in the various drawings indicate like elements.

DETAILED DESCRIPTION OF THE INVENTION

The present invention relates generally to digital controller systems, and more particularly to microcontroller based flash memory digital controller systems. The following description is presented to enable one of ordinary skill in the art to make and use the invention and is provided in the context of a patent application and its requirements. Various modifications to the implementations and the generic principles and features described herein will be readily apparent to those skilled in the art. Thus, the present invention is not intended to be limited to the implementations shown, but is to be accorded the widest scope consistent with the principles and features described herein.

Figure 1:
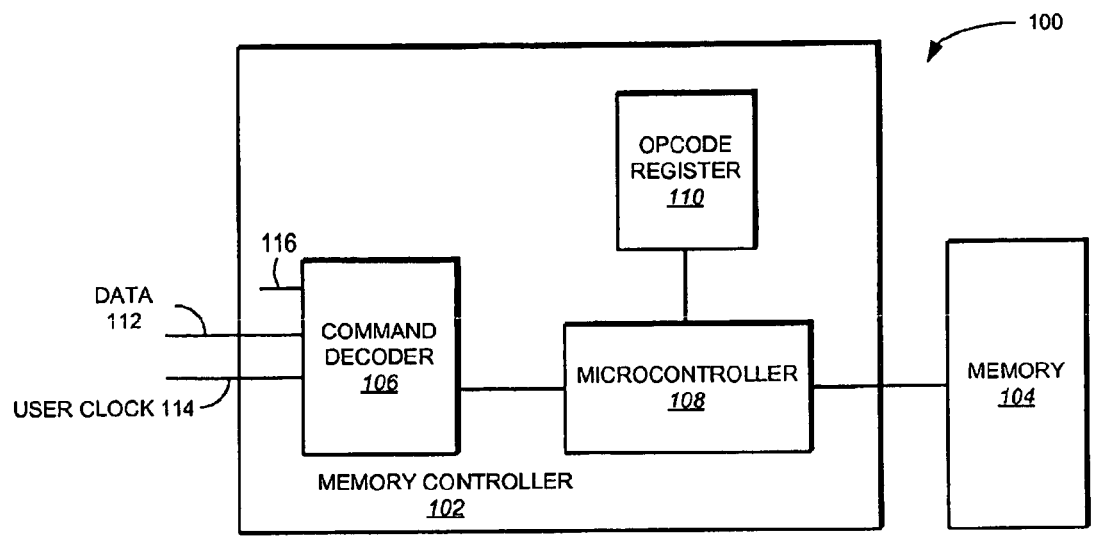
FIG. 1 is a block diagram of a digital controller system including a command decoder and a microcontroller according to one implementation of the invention.

FIG. 1 is a block diagram of a digital controller system 100 including a (digital) memory controller 102 and a memory 104 according to one implementation of the invention. The memory 104 can be a non-volatile flash memory or other memory such as, for example, a static RAM (SRAM) or dynamic RAM (DRAM). The memory controller 102 includes a command decoder 106, a microcontroller 108, and an opcode register 110.

In one implementation, the command decoder 106 includes a state machine for performing (pre-determined) simple commands (or command sequences) based on received data (e.g., data 112). Example simple commands include read, write, copy, erase, and so on. Accordingly, in this implementation, when the state machine performs simple commands the microcontroller 108 remains asleep to preserve power. In one implementation, the command decoder 106 is a user interface for receiving data 112 from a user according to a user clock 114. Unlike a conventional memory controller (or digital controller) including a state machine, the memory controller 102 further includes the microcontroller 108 and the opcode register 110 which permits the memory controller 102 to process additional commands not hardwired into the state machine. Although a microcontroller (e.g., microcontroller 108) is shown coupled to the command decoder 106, a co-processor, microprocessor, or a state machine (or any combination of a microcontroller, co-processor, microprocessor, or state machine) can also be implemented to perform the functions of the microcontroller 108 described herein.

Accordingly, in one implementation, the command decoder 106 provides for the extendibility of commands that can be processed through the memory controller 102. Because most of the commands that will be decoded are usually pre-determined and incorporated into hardware (e.g., a ROM or a state machine), it is desirable to have the ability to add new commands in software. In one implementation, such extendibility of commands is provided by the command decoder 106 through the use of one or more extended commands. When an extended command is sent to command decoder 106, (in one implementation) the user also sends a corresponding (e.g. 8-bit) opcode that is stored in the opcode register 110. The command decoder 106 then wakes the microcontroller 108, and informs the microcontroller 108 that an extended command is present. When the microcontroller 108 sees that the command decoder 106 has decoded an extended command, the microcontroller 108 reads the opcode stored in the opcode register 110 and processes (or executes) the opcode. The microcontroller 108 can be programmed to decode the opcode and execute an instruction sequence that was, e.g. not envisioned at the time that the command decoder 106 was architected. In one implementation, the 8-bit opcode provides the possibility of 256 additional commands that can be added after the memory controller 102 has been fabricated—e.g. after the state machine has been set and fixed. Furthermore, in one implementation, a test mode signal is provided that permits the memory controller 102 to support up to (e.g.) 256 additional test mode commands. In this implementation, the value of the testmode signal can be used indicate whether the command decoder 106 is in a test mode. More generally, the opcode register can be configured to store opcodes of any bit size and, accordingly, more or less than 256 additional commands (including test mode commands) can be supported.

In one implementation, the command decoder 106 is operable to detect the following types of commands—direct user commands, timed commands (including extended commands), and suspend/resume commands. A direct user command is a command that is generally processed by the command decoder 106 while the microcontroller 108 is asleep. Consequently, the memory controller 102 is operable to handle direct user commands at high speeds and with power efficiency. A timed command is a command which cannot be executed in one cycle, but rather, requires a series of events to occur in order for the command to be fully executed. In one implementation, the microcontroller 108 processes timed commands and, accordingly, the command decoder 106 wakes the microcontroller 108 to process timed commands. Examples of timed commands include commands related to programming and erasing the memory 104, setting or clearing non-volatile lock bits, page transfers from the memory 104, and various test mode and extended commands. A suspend command is a command that interrupts a currently executing timed command. In one implementation, the command decoder 106 generates an interrupt to the microcontroller 108 while the microcontroller 108 is executing a timed command. The suspend command sequence can be contained in an interrupt handler associated with the memory controller 102. A resume command is a command that wakes the microcontroller 108 so that the microcontroller 108 can resume execution of code at the point where the microcontroller 108 previously left off.

Figure 2:
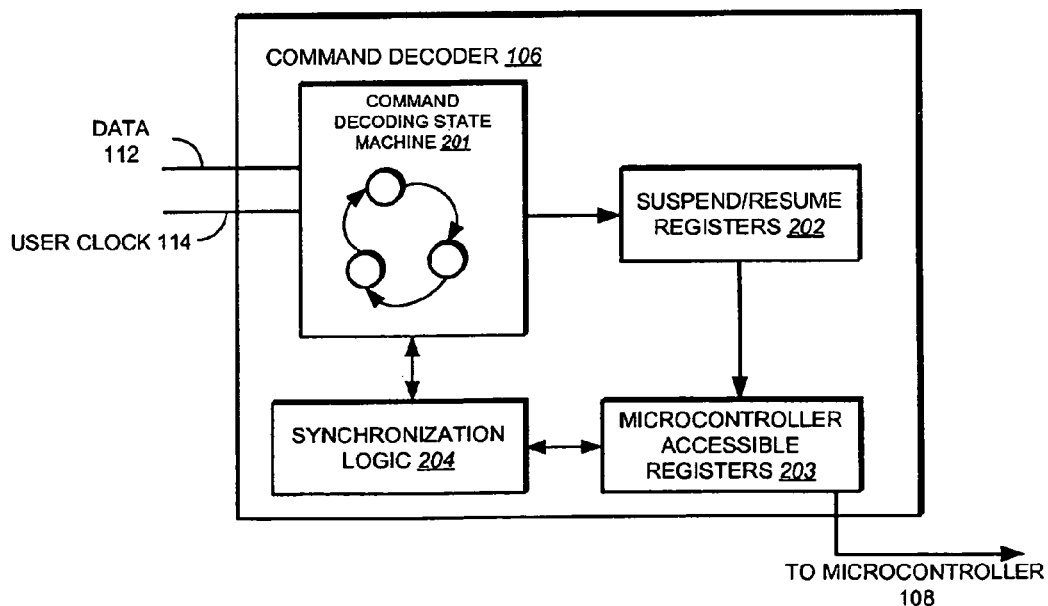
FIG. 2 is a block diagram of the command decoder of FIG. 1 according to one implementation of the invention.

FIG. 2 illustrates a block diagram of the command decoder 106 (FIG. 1) according to one implementation of the invention. As shown in FIG. 2, the command decoder 106 includes a command decoding state machine 201, suspend/resume registers 202, microcontroller accessible registers 203, and synchronization logic 204, the functions of which are described in greater detail in co-pending U.S. patent application entitled "Command Decoder For Microcontroller Based Flash Memory Digital Controller System", Ser. No. 11/288, 753, filed on Nov. 28, 2005, assigned to the assignee of the present application, and which is incorporated herein by reference. The functions of synchronization logic 204 are further described in greater detail in co-pending U.S. patent application entitled "Method and Apparatus For Synchronizing Data Between Different Clock Domains in a Memory Controller". Ser. No. 11/206,474, filed on Aug. 17, 2005, assigned to the assignee of the present application, and which is incorporated by reference herein.

In general, the command decoding state machine 201 decodes user commands and operates according to two different clock domains, an (asynchronous) user clock (e.g. user clock 114) and a (synchronous) digital clock associated with the memory controller 102. The user clock runs at a speed (or frequency) determined by a user's access sequence. The digital clock associated with the memory controller 102 typically runs at a lower speed (or frequency) relative to the user clock. The two clock domains allow the memory controller 102 to receive commands at a speed desired by the user without having to make the user wait for signals from the cycle based microcontroller 108. The suspend/resume registers 202 store state information when a command is suspended and later restored. The microcontroller accessible registers 203 comprises a plurality of registers that are accessible by microcontroller 108 (FIG. 1). In one implementation, the microcontroller accessible registers 203 include an opcode register (e.g., opcode register 110 of FIG. 1) for storing opcodes to be processed by the microcontroller 108. The synchronization logic 204 synchronizes the domains and ensures signals cross from the user domain to the memory controller domain in a deterministic and orderly manner. In one implementation, the synchronization logic 204 also synchronizes a wake signal to wake the microcontroller 108 to process, e.g., a timed command.

Figure 3:
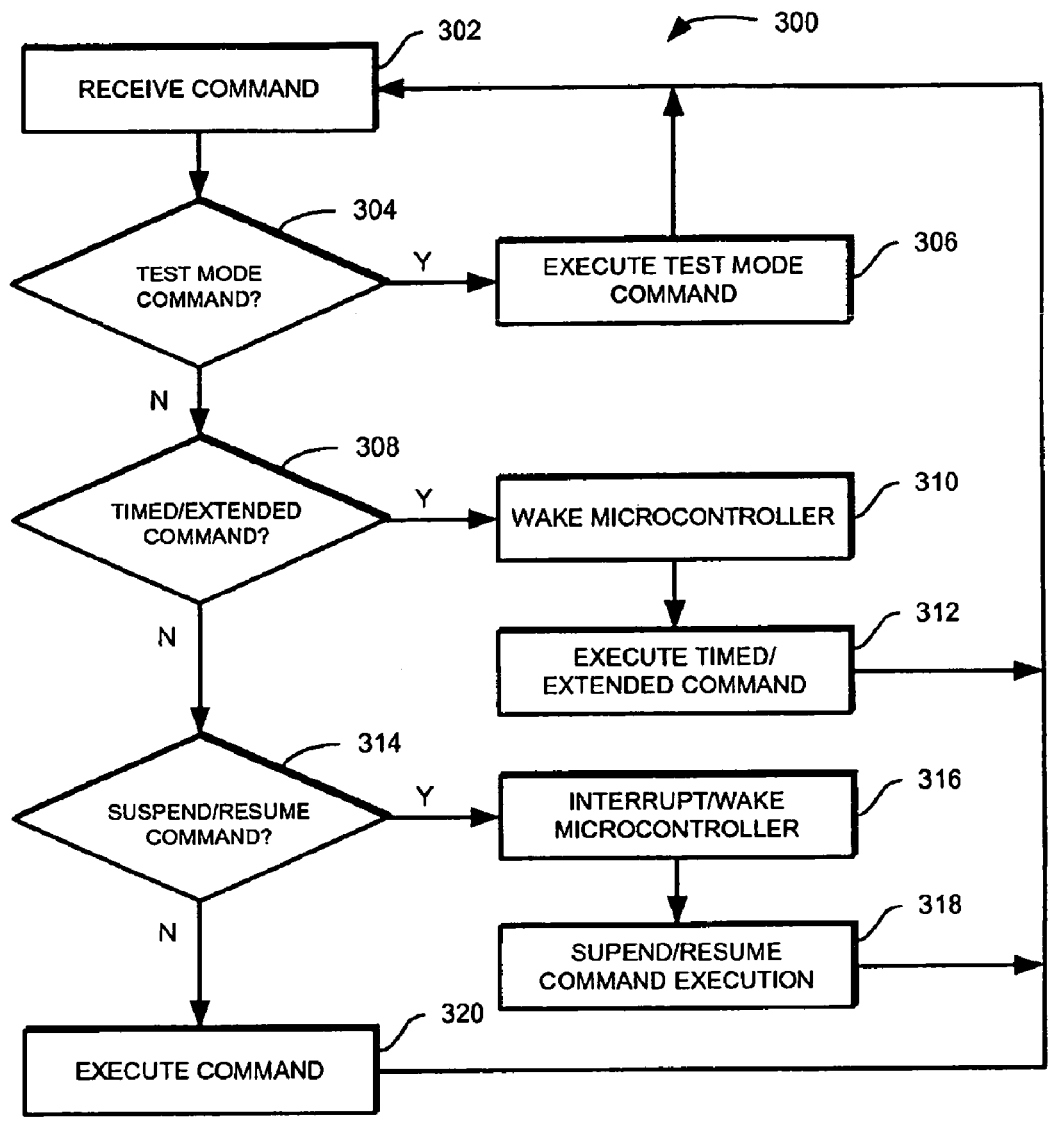
FIG. 3 illustrates a method of operation of the digital controller system of FIG. 1 according to one implementation of the invention.

FIG. 3 illustrates a method 300 of operation of a digital controller system (e.g., digital controller system 100 of FIG. 1) according to one implementation of the invention. A command is received by a command decoder (e.g., command decoder 106) (step 302). In one implementation, the command can be a test mode command, a timed command, a suspend/resume command, or a direct user command. A determination is made as to whether the command is a test mode command (step 304). If the command is a test mode command, then the test mode command is executed by the command decoder (step 306). In one implementation, test modes allow direct access to necessary test mode signals when a test mode command is decoded. In one implementation, test modes allow direct access to, e.g., RAMs, ROM, and registers on address and data buses associated with microcontroller 108. In one implementation, test modes can only be accessed when the microcontroller 108 is asleep to prevent contention.

If the command is determined to be a timed command (in step 308), a microcontroller (e.g., microcontroller 108) associated with the digital controller system is awakened (step 310). The microcontroller then executes (or processes) the timed command (step 312). As discussed above, timed commands include extended commands. In one implementation, when a user sends an extended command, the user also sends an (e.g., 8-bit) opcode that is stored in an opcode register (e.g., opcode register 110). The command decoder wakes the microcontroller and the microcontroller then executes the opcode stored in the opcode register.

If the command is determined to be suspend or resume command (in step 314), the microcontroller is respectively interrupted or awakened (step 316). Accordingly, if the command is a suspend command, then command execution of the microcontroller is suspended (step 318). In a similar manner, if the command is a resume command, then the microcontroller is awakened and resumes command execution (step 318). If the command is a direct user command, then the command is executed by the command decoder (step 320).

FIG. 4 illustrates a table 400 including test mode commands and extended commands that can be processed through digital controller system 100 of FIG. 1 according to one implementation of the invention. Table 400 illustrates examples of test mode command sequences (i.e., test mode commands) that make use of the extended command code and also test mode command sequences that do not make use of the extended command code. It can be seen from table 400 that some test mode command sequences involve setting the IO to the extended command code value on the third bus cycle. When the microcontroller 108 (FIG. 1) sees that the CMDCODE register (not shown) indicates an extended command has been received, then the microcontroller 108 will read code from the opcode register 110 (FIG. 1) along with address and data registers to decide what to do. The code stored in the opcode register 110 can be provided by a user (e.g., a test engineer in the case of a test mode command) on the address bus during the third bus cycle. For example, the first command in table 400 to use an extended command for test purposes is the "Load Trim Defaults" command. It can be seen that on the third bus cycle. EC is driven on the IO to indicate the extended command and the opcode of 0x01 is provided on the address bus.

For test mode commands that make use of the extended command, in one implementation, the execution of the command based on the opcode, address, and data is handled by the microcontroller 108. In one implementation, for test modes that have a specific command associated with them, for example. "Enter AVR Register Read Mode" or "Enter Data SRAM Read Mode," the command decoder 106 sets an internal flag that controls various muxes (not shown) thus allowing a user to have direct access to the register or RAM. Additionally, where a clock is required, such as when writing to registers, or reading and writing an SRAM or ROM, a clock pulse generator circuit (not shown) is used to create the clock by detecting the address change on the address bus.

The present invention provides a system and method for expanding the command set of a digital controller system. The present invention has been described in accordance with the implementations shown, and one of ordinary skill in the art will readily recognize that there could be variations to the implementations, and any variations would be within the scope of the present invention. For example, methods discussed above can be performed in a different order and still achieve desirable results. In addition, the opcode register 110 can be configured to store opcodes of any bit size. Accordingly, many modifications may be made by one of ordinary skill in the art without departing from the scope of the appended claims.

What is claimed is:

1. A method of operation for a digital controller system that interfaces with a memory, the method comprising:
    decoding one or more of a first plurality of commands through a hardware command decoding state machine that is coupled to a microcontroller, and performing the one or more of the first plurality of commands on the memory, wherein the microcontroller remains asleep during performance of the one or more of the first plurality of commands on the memory;
    in response to the hardware command decoding state machine decoding an extended command, waking the microcontroller to process an additional command other than a command among the first plurality of commands, the extended command being a command that notifies the microcontroller of the additional command to be processed;
    receiving an indication that the digital controller system is operating in a test mode; and
    using a combination of the extended command and a testmode pin associated with the digital controller system to notify the microcontroller of a test mode command to be processed during the test mode, wherein the testmode pin is not bonded out in a packaged part comprising the digital controller system.

2. The method of claim 1, wherein waking the microcontroller to process the additional command includes waking the microcontroller to decode an opcode associated with the extended command.

3. The method of claim 2, wherein the additional command and the extended command are received from a user.

4. The method of claim 2 further comprising:
    receiving the extended command at the hardware command decoding state machine;
    receiving the opcode at the hardware command decoding state machine when the extended command is received; and
    storing the opcode at a register outside the microcontroller before waking the microcontroller.

5. The method of claim 4, wherein the register is located at a command decoder where the hardware command decoding state machine is located.

6. The method of claim 1, wherein the hardware command decoding state machine is operable to process commands independent of the microcontroller including performing one or more of a read command, a write command, a copy command, or an erase command on the memory independent of the microcontroller.

7. The method of claim 1, wherein the hardware command decoding state machine is a user interface for receiving user commands and user data.

8. The method of claim 7, wherein the memory comprises a flash memory.

9. The method of claim 1, further comprising in response to the hardware command decoding state machine decoding a timed command, waking the microcontroller to process the timed command, the timed command being a command that requires more than one clock cycle to be fully processed.

10. A digital controller system configured to interface with a memory, the digital controller system comprising:
    a microcontroller;
    a hardware command decoding state machine operable to decode one or more of a first plurality of commands and perform the one or more of the first plurality of commands on the memory, wherein the microcontroller is configured to remain asleep when the command decoding state machine performs the one or more of the first plurality of commands on the memory, and wherein, in response to the hardware command decoding state machine decoding an extended command, the hardware command decoding state machine is operable to wake the microcontroller to process an additional command other than a command among the first plurality of commands, the extended command being a command that notifies the microcontroller of the additional command to be processed; and
    a testmode pin to receive an indication to notify the microcontroller of a test mode command, wherein the testmode pin is not bonded out in a packaged part that comprises the hardware command decoding state machine, wherein the hardware command decoding state machine is configured to receive an indication that the digital controller system is operating in a test mode and to use a combination of the extended command and the testmode pin to notify the microcontroller of the test mode command to be processed during the test mode.

11. The digital controller system of claim 10, wherein the hardware command decoding state machine is configured to receive an opcode when the hardware command decoding state machine decodes the extended command, and the digital controller system further comprises a register operable to store the opcode before the opcode is processed by the microcontroller.

12. The digital controller system of claim 11, wherein the opcode and the extended command are received by the digital controller system from a user.

13. The digital controller system of claim 11, wherein the register and the hardware command decoding state machine are located at a same command decoder of the digital controller system.

14. The digital controller system of claim 10, wherein the hardware command decoding state machine is operable to process commands independent of the microcontroller including performing one or more of a read command, a write command, a copy command, or an erase command on the memory independent of the microcontroller.

15. The digital controller system of claim 10, wherein the hardware command decoding state machine is a user interface for receiving user commands and user data.

16. The digital controller system of claim 10, wherein the memory comprises a flash memory.

17. The digital controller system of claim 10, wherein, in response to the hardware command decoding state machine decoding a timed command, the hardware command decoding state machine is operable to wake the microcontroller to process the timed command, the timed command being a command that requires more than one clock cycle to be fully processed.

18. The digital controller system of claim 10, wherein the microcontroller is configured to directly interface with the memory.

19. The digital controller system of claim 10, wherein the memory comprises one of a dynamic RAM (DRAM) and a static RAM (SRAM).

20. A command decoder configured to be implemented within a digital controller system, the digital controller system interfacing with a memory, the command decoder comprising:
    a command decoding state machine operable to decode one or more of a first plurality of commands including an extended command;
    a register circuitry accessible by a microcontroller for storing an opcode associated with the extended command, wherein the command decoder is operable to wake the microcontroller when the command decoding state machine decodes the extended command, the extended command being a command that notifies the microcontroller of the opcode to be processed; and a testmode pin to receive an indication to notify the microcontroller of a test mode command, wherein testmode pin is not bonded out in a packaged part that comprises the command decoding state machine, wherein the command decoding state machine is configured to receive an indication that the digital controller system is operating in a test mode and to use a combination of the extended command and the testmode pin to notify the microcontroller of the test mode command to be processed during the test mode.

21. The command decoder of claim 20, wherein the first plurality of commands and the extended command are hardwired into the command decoding state machine at a time of fabrication of the command decoder.

22. The command decoder of claim 20, wherein the command decoding state machine is operable to process commands independent of the microcontroller including performing one or more of a read command, a write command, a copy command, or an erase command on the memory independent of the microcontroller.

23. The command decoder of claim 20, wherein, in response to the command decoding state machine decoding a timed command, the command decoder is operable to wake the microcontroller to process the timed command, the timed command being a command that requires more than one clock cycle to be fully processed.

24. The command decoder of claim 20, further comprising one or more suspend registers for storing state information associated with the microcontroller when processing of the microcontroller is interrupted.

25. The command decoder of claim 24, further comprising synchronization logic operable to synchronize a command received by the command decoder from a first clock domain to a second clock domain that is different from the first clock domain.

26. The command decoder of claim 20, wherein the command decoding state machine is operable to perform a command for reading the memory, and the microcontroller is operable to perform a command for erasing the memory.

27. The command decoder of claim 20, wherein the command decoding state machine, the register circuitry, and the microcontroller are located at a same memory controller.

28. The command decoder of claim 27, wherein the memory controller is configured to directly interface with the memory.

29. A command decoder comprising:

a command decoding state machine operable to decode at least one command among a plurality of commands including an extended command;

a register circuitry accessible by a microcontroller to store an opcode associated with the extended command, wherein the command decoder is operable to notify the microcontroller to process the opcode when the command decoding state machine decodes the extended command; and a testmode pin to receive a test mode command that indicates a test mode, wherein the testmode pin is not bonded out in a packaged part that comprises the command decoding state machine, wherein the command decoding state machine is configured to use a combination of the extended command and the testmode pin to notify the microcontroller of the test mode command to be processed during the test mode.

30. The method of claim 29, wherein the command decoding state machine is operable to decode the at least one command and the extended command when the microcontroller is asleep.

31. The method of claim 29, wherein the command decoding state machine is operable to process commands independent of the microcontroller including performing one or more of a read command, a write command, and an erase command.

* * * * *